US011021946B2

(12) United States Patent
Puls et al.

(10) Patent No.: US 11,021,946 B2
(45) Date of Patent: Jun. 1, 2021

(54) SYSTEMS AND METHODS FOR MEASURING LOADS APPLIED TO DOWNHOLE STRUCTURES

(71) Applicant: EOG Resources, Inc., Houston, TX (US)

(72) Inventors: Conrad L. Puls, Garden Ridge, TX (US); George Wyatt Tubb, San Antonio, TX (US); Frederick Charles Lochte, San Antonio, TX (US); Sean Michael Roy, San Antonio, TX (US); Donald W. Johnson, San Antonio, TX (US)

(73) Assignee: EOG RESOURCES, INC., Houston, TX (US)

( * ) Notice: Subject to any disclaimer, the term of this patent is extended or adjusted under 35 U.S.C. 154(b) by 298 days.

(21) Appl. No.: 16/046,782

(22) Filed: Jul. 26, 2018

(65) Prior Publication Data

US 2019/0032471 A1   Jan. 31, 2019

Related U.S. Application Data

(60) Provisional application No. 62/538,294, filed on Jul. 28, 2017.

(51) Int. Cl.
*E21B 49/00* (2006.01)
*E21B 47/009* (2012.01)
*E21B 43/12* (2006.01)
*E21B 17/10* (2006.01)
*G01L 5/00* (2006.01)

(52) U.S. Cl.
CPC ........ *E21B 47/009* (2020.05); *E21B 17/1078* (2013.01); *E21B 43/127* (2013.01); *G01L 5/0033* (2013.01); *G01L 5/0085* (2013.01)

(58) Field of Classification Search
CPC .. E21B 17/1078; E21B 43/127; E21B 47/009; G01L 5/0033; G01L 5/0085
See application file for complete search history.

(56) References Cited

U.S. PATENT DOCUMENTS

| | | | | | |
|---|---|---|---|---|---|
| 1,585,634 | A | * | 5/1926 | Axelson | .................... G01L 5/08 73/862.543 |
| 3,216,245 | A | * | 11/1965 | Seed | ...................... G01L 1/2218 73/862.382 |
| 3,343,409 | A | * | 9/1967 | Gibbs | ................... E21B 43/127 73/152.61 |

(Continued)

*Primary Examiner* — John Fitzgerald
(74) *Attorney, Agent, or Firm* — Conley Rose, P.C.

(57) ABSTRACT

A load measurement sub for measuring a load transferred between the sub and an inner surface of a tubing string includes a housing. The housing includes a central axis, an internal cavity, and a radially outermost surface. In addition, the load measurement sub includes a first load measurement assembly at least partially disposed within a first port extending from the radially outermost surface to the internal cavity. The first load measurement assembly includes a first button extending radially from the first port and the radially outermost surface of the housing. The first load measurement assembly also includes a first load cell. Further, the load measurement sub includes a first biasing member disposed between the first button and the first load cell. The first biasing member is configured to bias the first button away from the first load cell.

14 Claims, 11 Drawing Sheets

(56) References Cited

U.S. PATENT DOCUMENTS

| | | | | |
|---|---|---|---|---|
| 3,355,938 A | * | 12/1967 | Neely | E21B 43/127 73/862.543 |
| 3,457,781 A | * | 7/1969 | Elliott | G01L 5/0061 73/152.62 |
| 3,765,234 A | * | 10/1973 | Sievert | G01L 3/00 73/862.191 |
| 4,090,405 A | * | 5/1978 | McKee | G01L 5/0061 73/152.61 |
| 4,208,665 A | * | 6/1980 | Mills | E21B 43/127 346/33 R |
| 4,305,461 A | * | 12/1981 | Meyer | F04B 47/026 166/77.4 |
| 4,445,578 A | | 5/1984 | Millheim | |
| 4,932,253 A | * | 6/1990 | McCoy | G01L 5/102 73/152.61 |
| 4,962,668 A | * | 10/1990 | Preston | E21B 49/006 73/784 |
| 5,182,946 A | * | 2/1993 | Boughner | E21B 47/00 73/152.62 |
| 5,358,059 A | | 10/1994 | Ho | |
| 5,406,482 A | * | 4/1995 | McCoy | E21B 47/009 702/6 |
| 5,494,105 A | * | 2/1996 | Morris | E21B 47/09 166/255.1 |
| 5,513,703 A | * | 5/1996 | Mills | E21B 23/04 166/316 |
| 5,589,633 A | * | 12/1996 | McCoy | E21B 47/009 417/63 |
| 5,941,305 A | * | 8/1999 | Thrasher | E21B 43/121 166/53 |
| 6,041,856 A | * | 3/2000 | Thrasher | E21B 43/121 166/53 |
| 6,450,022 B1 | * | 9/2002 | Brewer | E21B 47/007 73/152.48 |
| 6,662,645 B2 | * | 12/2003 | Brewer | E21B 47/007 73/152.48 |
| 7,878,266 B2 | * | 2/2011 | Griffin | E21B 47/26 175/40 |
| 8,096,196 B2 | * | 1/2012 | Eilersen | G01L 19/04 73/862.623 |
| 8,191,651 B2 | | 6/2012 | Hall et al. | |
| 9,303,505 B2 | | 4/2016 | Spencer et al. | |
| 9,645,575 B2 | * | 5/2017 | Watson | E21B 41/0092 |
| 2002/0124640 A1 | * | 9/2002 | Brewer | E21B 47/007 73/152.49 |
| 2009/0050368 A1 | * | 2/2009 | Griffin | E21B 47/007 175/40 |
| 2012/0106297 A1 | * | 5/2012 | Fraser | E21B 47/18 367/83 |
| 2014/0182943 A1 | * | 7/2014 | Iblings | E21B 21/12 175/65 |
| 2015/0369038 A1 | * | 12/2015 | Brown-Kerr | E21B 31/20 166/255.1 |
| 2017/0235284 A1 | * | 8/2017 | Watson | E21B 41/0092 700/31 |
| 2018/0045032 A1 | * | 2/2018 | Suermondt | E21B 47/06 |
| 2019/0353025 A1 | * | 11/2019 | Alshehri | E21B 47/002 |
| 2020/0232306 A1 | * | 7/2020 | Brown-Kerr | E21B 43/10 |

* cited by examiner

SYSTEMS AND METHODS FOR MEASURING LOADS APPLIED TO DOWNHOLE STRUCTURES

CROSS-REFERENCE TO RELATED APPLICATIONS

This application claims benefit of U.S. provisional patent application Ser. No. 62/538,294 filed Jul. 28, 2017, and entitled "Systems and Methods for Measuring Loads Applied to Downhole Structures," which is hereby incorporated herein by reference in its entirety.

STATEMENT REGARDING FEDERALLY SPONSORED RESEARCH OR DEVELOPMENT

Not applicable.

BACKGROUND

This disclosure relates generally to systems and methods for producing fluids from a subterranean wellbore. More particularly, this disclosure relates to pumping assemblies for lifting fluids from a subterranean wellbore.

A variety of different systems can be employed to lift fluids (e.g., water, hydrocarbons, etc.) from a subterranean wellbore. For example, in many wells, a pumping assembly is used to reciprocate a sucker rod within the wellbore to draw fluids in the wellbore to the surface. During operation of such pumping assemblies, the sucker rod may contact and slide against the inner surface of the casing lining the wellbore or other tubular disposed within the wellbore. Such sliding, frictional engagement of the sucker rod with another downhole structure (e.g., the casing, a tubular, etc.) can lead to wear of the sucker rod and/or the other downhole structure. If the wear is sufficient, production operations are ceased to allow for repair and/or replacement of the sucker rod and/or tubular.

BRIEF SUMMARY OF THE DISCLOSURE

Embodiments of load measurement subs for measuring loads transferred between the sub and an inner surface of a tubing string are disclosed herein. In one embodiment, a load measurement sub, the load measurement sub comprises a housing including a central axis, an internal cavity, and a radially outermost surface. In addition, the load measurement sub comprises a first load measurement assembly at least partially disposed within a first port extending from the radially outermost surface to the internal cavity. The first load measurement assembly includes a first button extending radially from the first port and the radially outermost surface of the housing. The first load measurement assembly also includes a first load cell. Further, the load measurement sub comprises a first biasing member disposed between the first button and the first load cell. The first biasing member is configured to bias the first button away from the first load cell.

Embodiments of force measurement assemblies for sucker rods of pumping assemblies are disclosed herein. In one embodiment, the force measurement assembly comprises a load measurement sub including a load measurement assembly configured to measure a load transferred between the load measurement sub and an inner surface of a tubing string. In addition, the force measurement assembly comprises a data and power sub coupled to the load measurement sub. The data and power sub includes a memory coupled to the at least one load measurement assembly and configured to receive measured load values from the at least one load measurement assembly.

Embodiments of methods for adjusting a number and an arrangement of guides for centralizing a sucker rod of a pumping assembly within a tubing string of a subterranean wellbore are disclosed herein. In one embodiment, a method comprises (a) installing a force measurement assembly along the sucker rod. In addition, the method comprises (b) reciprocating the sucker rod and force measurement assembly within the tubing string after (a). Further, the method comprises (c) engaging a load measurement assembly of the force measurement assembly with an inner surface of the tubing string during (b). Still further, the method comprises (d) measuring a load transferred between the load measurement assembly and the inner surface with the load measurement assembly. Moreover, the method comprises (e) setting at least one of a number or an arrangement of guides within the tubing string based on the load measured with the load measurement assembly in (d).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1:
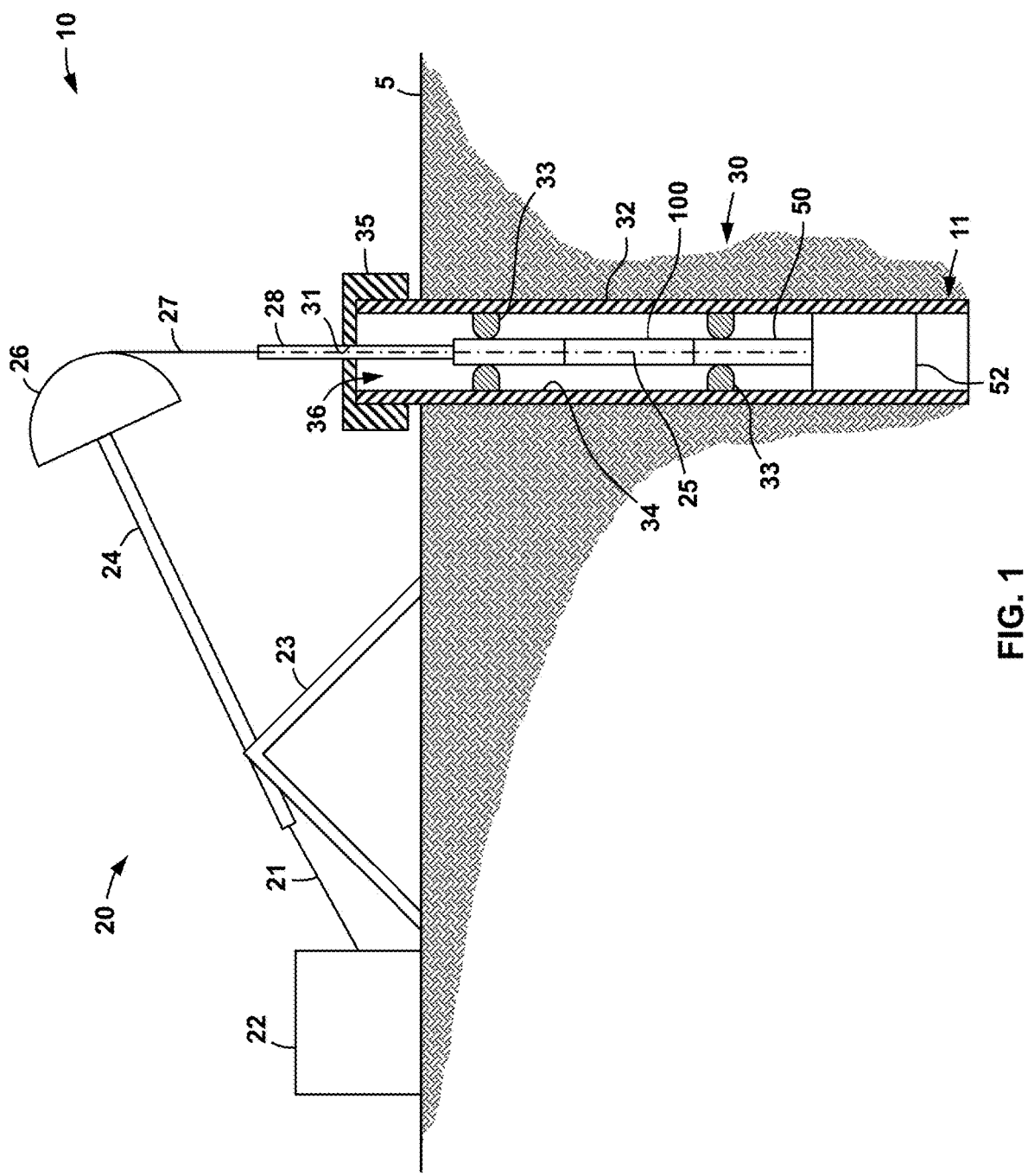
FIG. 1 is a schematic view of an embodiment of a production system in accordance with principles disclosed herein for lifting fluids from a subterranean wellbore.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, the words "approximately," "about," "generally," "substantially," and the like are used herein to mean+/−10%.

Referring now to FIG. 1, an embodiment of a production system 10 for lifting hydrocarbons (e.g., oil, condensate, gas, etc.) from a subterranean wellbore 11 is shown. In this embodiment, production system 10 includes a sucker rod pump, and in particular, a pumping actuator or unit 20 disposed at the surface 5 and a lift assembly 30 suspended from unit 20 in wellbore 11. Since production system 10 employs pumping unit 20 and associated lift assembly 30 to produce hydrocarbons from wellbore 11, production system 10 may also be referred to herein as a pumping or pump assembly.

Surface pumping unit 20 includes a motor or driver 22 (e.g., electric motor, internal combustion engine, gas or steam turbine, hydraulic motor, etc.), a support frame 23, a walking beam 24, and a horsehead 26. Walking beam 24 is pivotably mounted to support frame 23 and is operatively coupled to motor 22 via coupling 21 so that operation of motor 22 causes walking beam 24 to pivot relative to frame 23 during operations. Horsehead 26 is disposed at a distal end of walking beam 24 so that horsehead 26 is traversed along an arc (which is more or less vertically oriented) as walking beam 24 pivots relative to frame 23.

Referring still to FIG. 1, subterranean assembly 30 includes a downhole pumping unit 52, a sucker rod string 50 reciprocating into and out of the downhole pumping unit 52, and a polished rod 28 coupled to sucker rod 50 and extending through an aperture 31 in the wellhead 35. An annular dynamic or sloding seal is provided between polished rod 28 and wellhead 35. Sucker rod string 50, which may also be referred to herein as simply "sucker rod," includes a plurality of rigid steel rods threadably connected end-to-end. A cable 27 extends between horsehead 26 and polished rod 28 to drive reciprocation of polished rod 28 and sucker rod 50 within throughbore 36 of casing or tubing 32 disposed within wellbore 11. Specifically, during operations, walking beam 24 and horsehead 26 pivot about frame 23 via motor 22 as previously described.

During this operation, cable 27 transfers forces from the horsehead to polished rod 28 so that rod 28 reciprocates up and down within aperture 31 of wellhead 35. While not specifically shown, aperture 31 may include a stuffing or packing assembly that maintains the dynamic seal with the outer surface of polished rod 28 so that fluid pressure within throughbore 36 of tubing 32 is maintained. As polished rod 28 reciprocates within aperture 31, sucker rod 50 is also driven to reciprocate within throughbore 36 along a central axis 25 so that a plunger or other suitable device (not shown) coupled to sucker rod 50 is reciprocated within downhole pumping unit 52 to facilitate pressurization and flow of wellbore fluid (e.g., fluids produced from the subterranean formation surrounding wellbore 11 below surface 5) to the surface 5 via one or more fluid paths within wellbore 11 (e.g., throughbore 36). In general, downhole pumping unit 52 can comprise any suitable device known in the art that operates with a reciprocating sucker rod (e.g., rod 50) to lift fluids in a wellbore to the surface.

Referring still to FIG. 1, during reciprocation of sucker rod 50 within throughbore 36, rod 50 may engage (e.g., slidingly engage, impact, rub, etc.) the inner surface 34 of tubing 32 through which rod 50 extends. As a result, tubing 32 and/or sucker rod 50 will wear over time. If the wear is sufficient, repair or replacement of tubing 32 and/or sucker rod 50 (e.g., workover) may be necessary to allow for continued pumping operations.

Guides or centralizers 33 may be installed within throughbore 36 to maintain spacing between sucker rod 50 and inner surface 34 during operations. However, such guides 33 are relatively expensive to purchase and install. As a result, the greater the number of guides 33 installed, the less economical the production from the wellbore (e.g., wellbore 11).

Conventionally, the number and placement of guides 33 within throughbore 36 is mathematically estimated based on several factors (e.g., wellbore deviation, wellbore depth, rod string design factors, anticipated wellbore fluids, pump intake pressure, pump fillage, pumping unit speed, etc.). However, due to assumptions and potential inaccuracies is such estimations, operators may be concerned that the number and placement of guides 33 could be further optimized to enhance the production economics for certain wells. In addition, such optimization may further decrease the wear on either or both of the rod string 50 and tubing 32, thereby delaying or avoiding a workover and associated expense. Accordingly, embodiments disclosed herein are directed to systems and methods for directly measuring the loads transferred between sucker rod 50 and inner surface 34 of tubing 32 during pumping operations to optimize the number and arrangement of guides 33 within a well bore (e.g., wellbore 11). For example, FIG. 1 illustrates a force measurement assembly 100 disposed along sucker rod 50. The structural details of embodiments of force measurement assembly 100 and its components will now be described in more detail.

Figure 2:
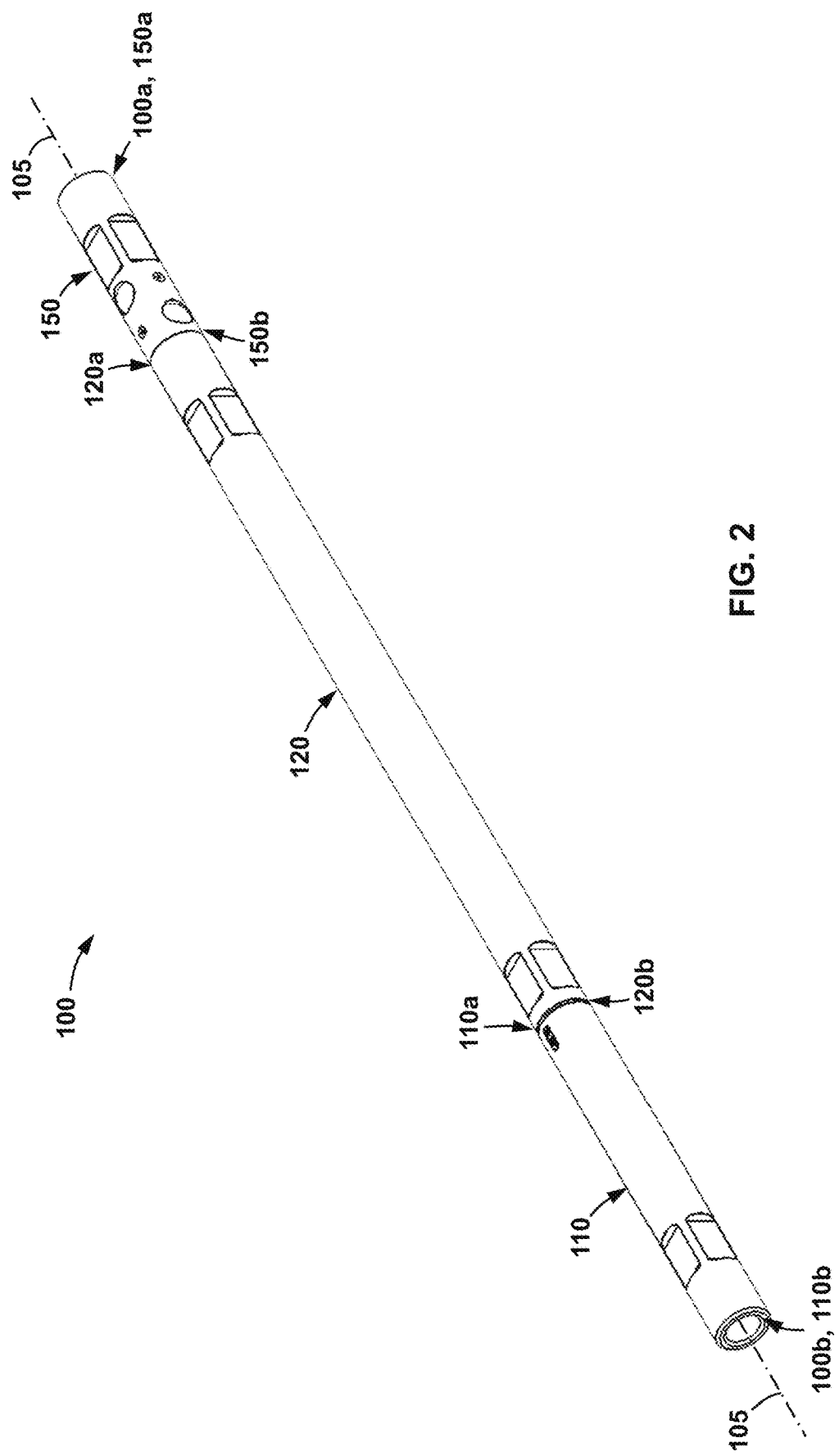
FIG. 2 is a perspective view of the force measurement assembly of FIG. 1.

Referring now to FIG. 2, force measurement assembly 100 includes a central or longitudinal axis 105, a first or upper end 100a, and a second or lower end 100b opposite end 100a. In addition, force measurement assembly 100 includes a load measurement sub 150 disposed at first end 100a, a tension measurement sub 110 disposed at second end 100b, and a data and power sub 120 axially positioned between subs 110, 150. In this embodiment, sub 120 extends axially from sub 110 to sub 150.

Load measurement sub 150 includes a first or upper end 150a and a second or lower end 150b opposite end 150a, data and power sub 120 includes a first or upper end 120a and a second or lower end 120b opposite end 120a, and tension measurement sub 110 includes a first or upper end 110a and a second or lower end 110b opposite end 110a. First end 150a of sub 150 is coincident with and defines first end 100a of assembly 100, and second end 150b of sub 150 is attached (e.g., threadably) with first end 120a of data and power sub 120. Second end 120b of sub 120 is attached (e.g., threadably) with first end 110a of tension measurement sub 110. Second end 110b of sub 110 is coincident with and defines second end 100b of load measurement assembly 100.

Figure 3:
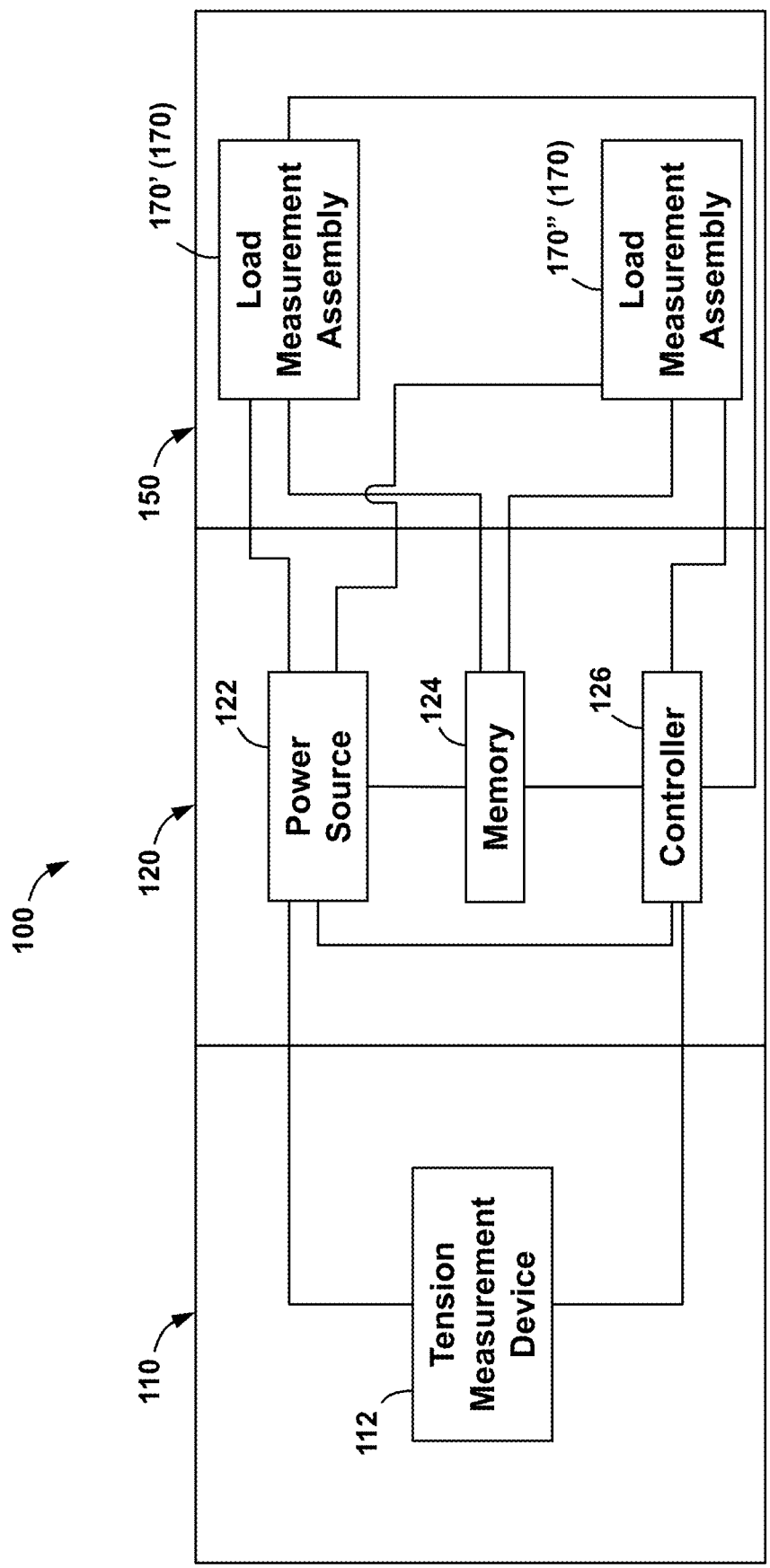
FIG. 3 is a schematic block diagram of the force measurement assembly of FIG. 2.

Referring now to FIG. 3, load measurement sub 150 includes one or more load measurement assemblies 170 to detect and measure loads transferred between load measurement sub 150 and another structure that comes into contact with sub 150 (e.g., inner surface 34 of tubing 32 in FIG. 1). In this embodiment, load measurement sub 150 includes a first load measurement assembly 170' and a second load measurement assembly 170". Data and power sub 120 includes a power source 122, a memory 124, and a controller 126. Tension measurement sub 110 includes at least one tension measurement assembly 112 (only one assembly 112 is shown in FIG. 3). One having ordinary skill will appreciated that the components of subs 150, 120, 110 (e.g., load measurement assemblies 170, power source 122, memory 124, controller 126, and tension measurement assemblies 112, etc.) may include an electrical circuit or collection of electrical circuits configured and operable to carry out the functions discussed herein.

Power source 122 provides electrical power to the components of force measurement assembly 100 (e.g., load measurement assemblies 170, memory 124, controller 126, and tension measurement assemblies 112, etc.). In general, power source 122 can comprise a battery (disposable or rechargeable), a charged capacitor, a wireless power receiver (e.g., inductive coil, etc.), or other source of electrical power. Memory 124 stores data and software. Data consumed or produced by software (e.g., software stored on memory 124) can also be stored on memory 124. For example, measured load or tension values (e.g., measured by load measurement assemblies 170', 170" and tension measurement device 112, respectively), etc. can be stored on memory 124. In general, memory 124 can comprise volatile storage (e.g., random access memory), nonvolatile storage (e.g., flash storage, read only memory, etc.), or combinations of both volatile and non-volatile storage. Controller 126 executes software stored on memory 124. Specifically, controller 126 causes or actuates load measurement assemblies 170 and/or tension measurement assemblies 112 to take measurements during operations. In at least some embodiments, controller 126 performs analysis or processing of raw data obtained by tension measurement assemblies 112 and/or load measurement assemblies 170. In general, controller 126 may comprise a hardware processor, microcontroller embedded controller, microprocessor, ASIC (application specific integrated circuit), and/or any other type of circuit that can perform the functions discussed herein.

During operations, as sucker rod 50 is reciprocated within throughbore 36 of tubing 32 (see FIG. 1), load measurement assemblies 170', 170" detect and measure the loads transferred to or from inner surface 34 of tubing 32, and communicate the measured loads to memory 124 for storage thereon. As previously described, controller 126 may perform processing of the measured values from assemblies 170', 170" prior or subsequent to storage of the measured values on memory 124. Similarly, during these operations, tension measurement device 112 measures the tension on sucker rod 50, and communicates the measured tensions to memory 124 for storage thereon. As with the load measurements from assemblies 170', 170", the measured data from tension measurement device 112 may be processed (e.g., by controller 126) either before or after storage on memory 124.

Figure 4:
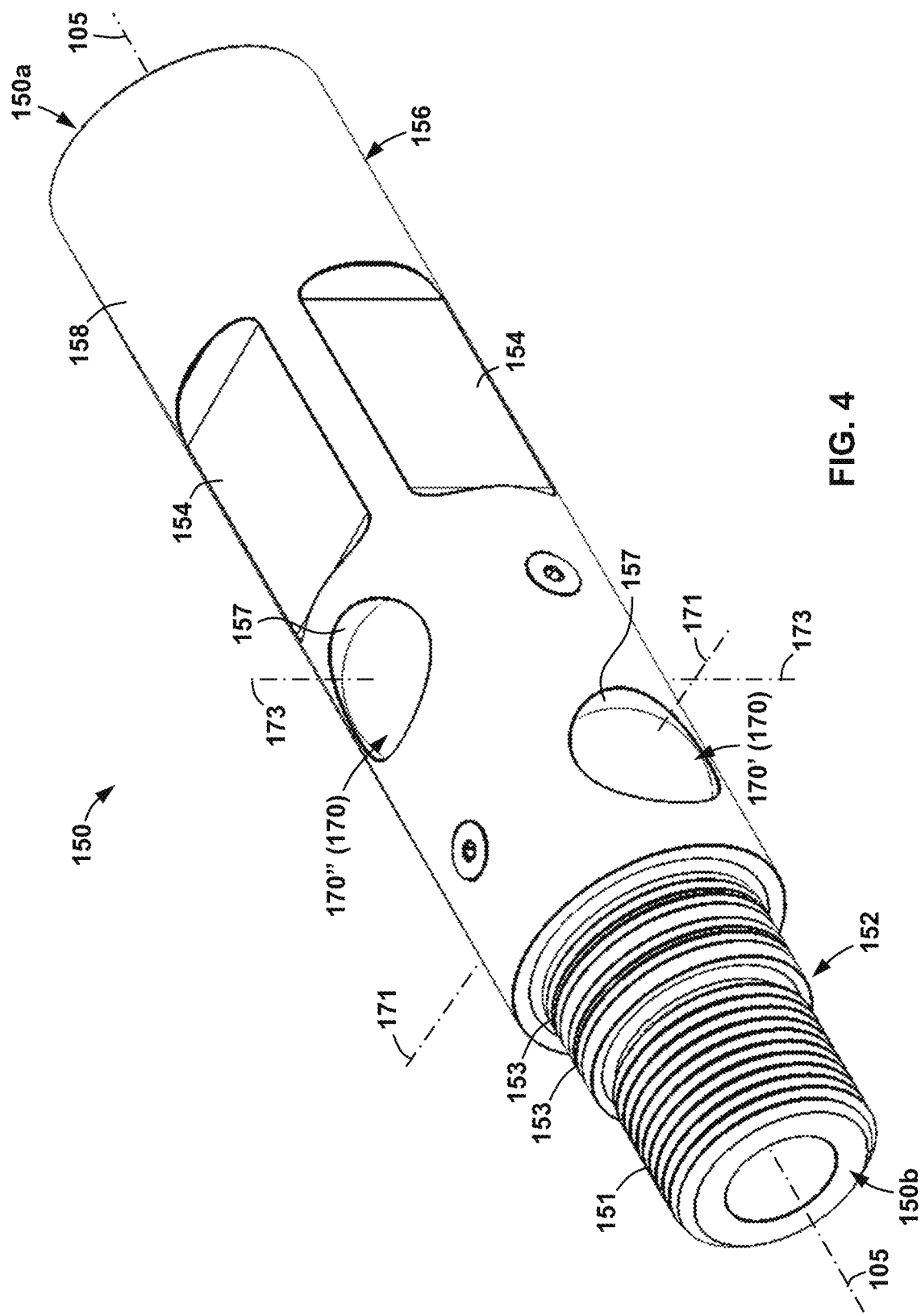
FIG. 4 is a perspective view of the load measurement sub of the force measurement assembly of FIG. 2.
Figure 5:
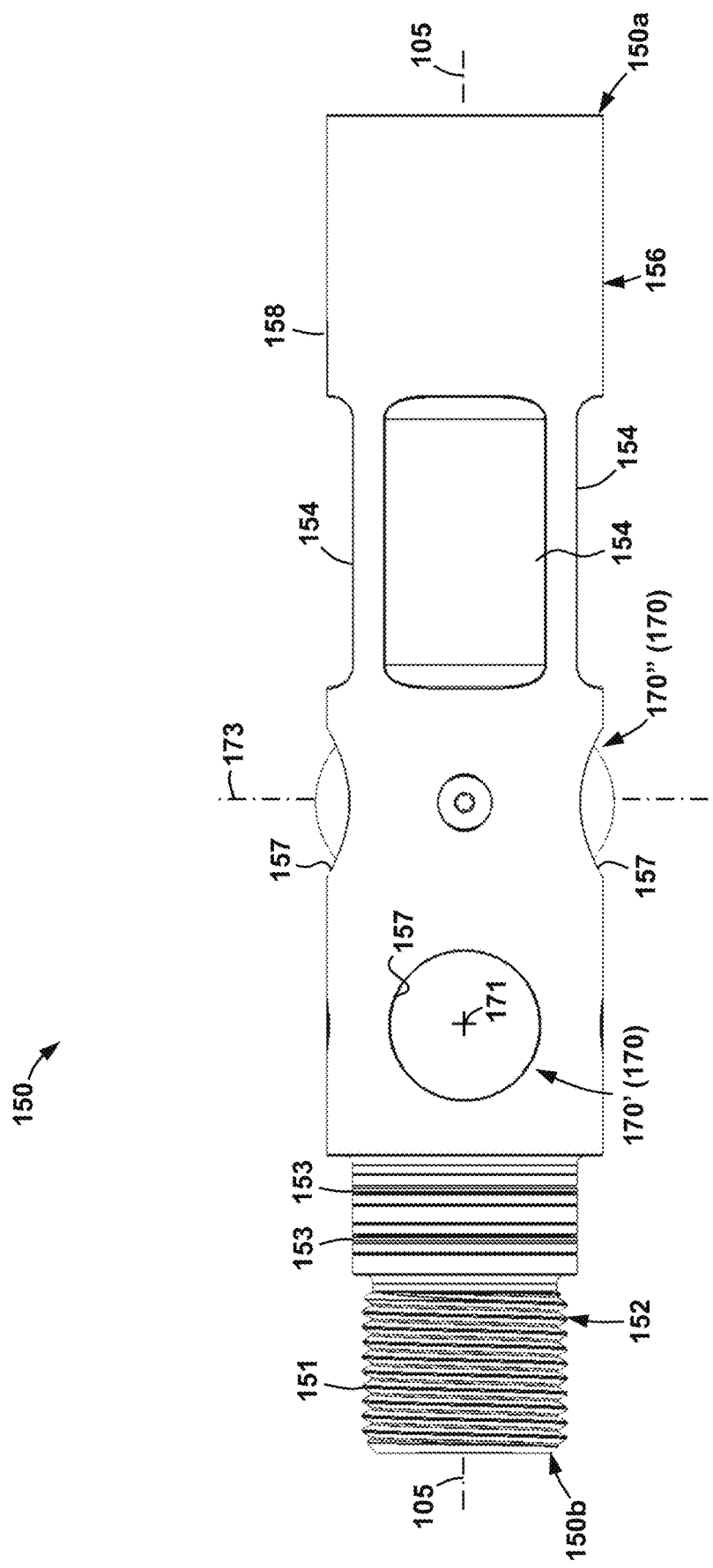
FIG. 5 is a side view of the load measurement sub of FIG. 4.

Referring now to FIGS. 4 and 5, load measurement sub 150 includes a connector 152 at second end 150b and an elongate cylindrical body 156 extending axially from connector 152 to first end 150a. Connector 152 includes external threads 151 for engagement with corresponding internal threads at first end 120a of data and power sub 120 (see FIG. 2). In addition, connector 152 includes one or more sealing assemblies 153 for providing an annular seal between subs 120, 150 (see FIG. 2) at the threaded connection therebetween.

Cylindrical body 156 includes a generally cylindrical radially outer surface 158 extending axially from connector 152 to first end 150a. A plurality of circumferentially-spaced facets or flats 154 are disposed along outer surface 158. Facets 154 provide planar surfaces that can be engaged with a wrench or other suitable torque transfer tool (not shown) to facilitate connection (e.g., threading) of subs 120, 150 (see FIG. 2). In this embodiment, there are a total of four facets 154 uniformly spaced approximately 90° from one another about axis 105. In addition, a plurality of ports 157 extend radially inward from radially outer surface 158 to provide access for one or more components of load measurement assemblies disposed at least partially within load measurement sub 150 (e.g., load measurement assemblies 170', 170") during operations. Ports 157 are oriented perpendicular to axis 105.

Referring still to FIGS. 4 and 5, load measurement sub 150 includes a plurality of load measurement assemblies 170. Specifically, in this embodiment, load measurement sub 150 includes first load measurement assembly 170' and second load measurement assembly 170" previously described. First load measurement assembly 170' is axially disposed between connector 152 and facets 154, and second load measurement assembly 170" is axially disposed between first load measurement assembly 170' and facets 154. In this embodiment, load measurement assemblies 170', 170" are identical, except for their orientation. Specifically, first load measurement assembly 170' is disposed or oriented along an axis 171 that is orthogonal to axis 105 of force measurement assembly 100 (e.g., axes 171, 105 intersect and are oriented perpendicular to each other), and second load measurement assembly 170" is disposed or oriented along an axis 173 that is also orthogonal to axis 105 (e.g., axes 173, 105 intersect and are oriented perpendicular to each other). In addition, axis 173 is rotated 90° from axis 171 about axis 105. Thus, axis 173 is oriented perpendicular to axis 171 in end view looking along axis 105. However, axes 171, 173 are axially spaced apart, and thus, axes 171, 173 do not intersect. In other embodiments, it should be appreciated that axis 173 may be oriented at any angle between 0° and 180° (e.g., greater than 0° and less than 180°) relative to axis 171 about axis 105. Without being limited to this or any other theory, the orientation of load measurement assemblies 170', 170" generally perpendicular to each other allows sub 150 to measure and capture forces transferred to or from tubing 32 (FIG. 1) in different radial directions about axis 105 during operations (in this case two radial directions).

Figure 6:
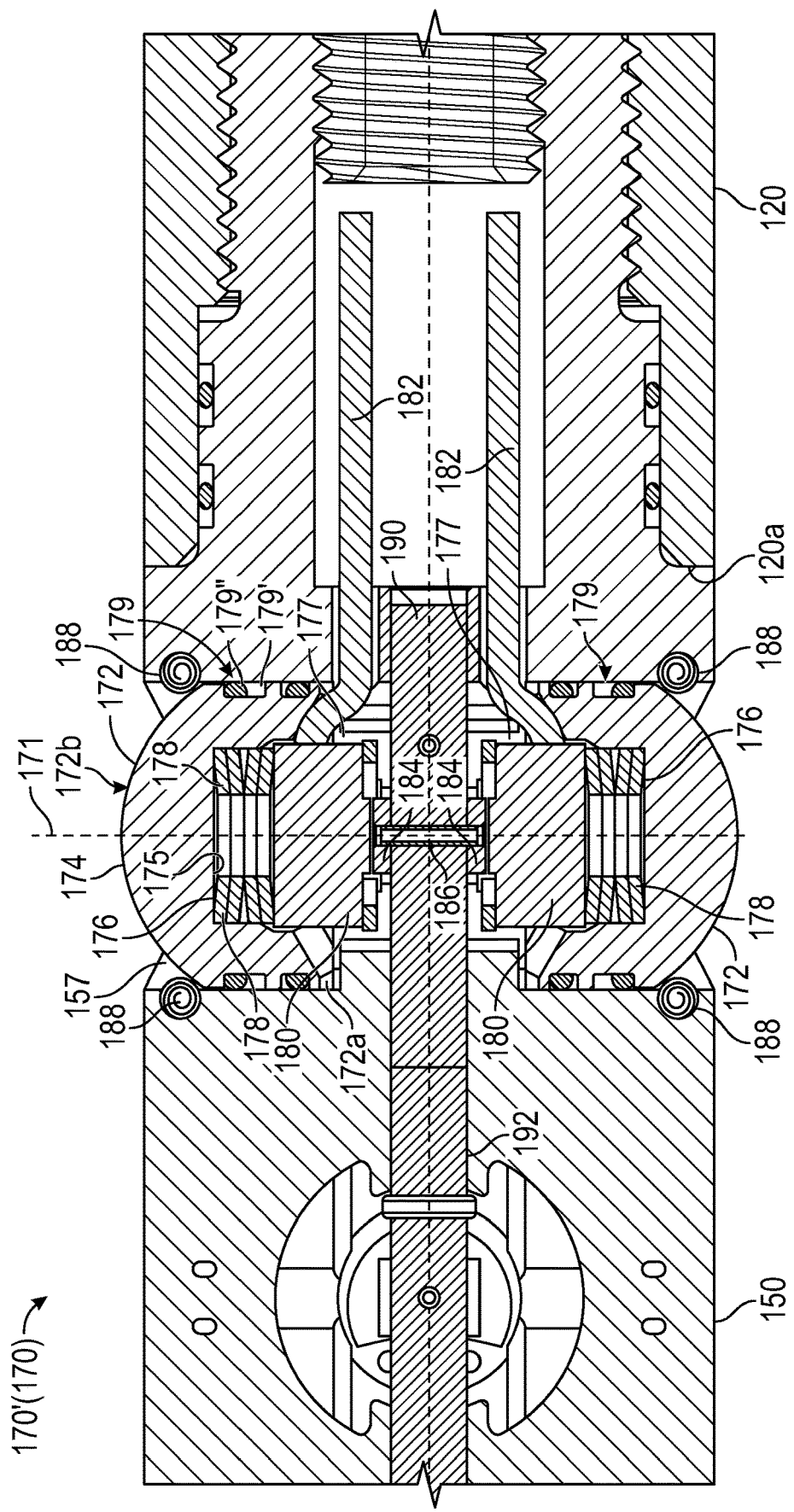
FIG. 6 is a cross-sectional side view of the load measurement sub of FIG. 4.

Referring now to FIG. 6, first load assembly 170' is shown, it being understood that second load assembly 170" is the same (except for the different orientations as described above). As shown in FIG. 6, first load measurement assembly 170' is disposed within a pair of radially extending ports 157 in body 156. In this embodiment, first load assembly 170' includes a pair of force transfer elements or buttons 172, and a pair of load cells 180. A reaction member or rod 190 is disposed within an axially extending cavity or through passage 192 within body 156 of load measurement sub 150 and is aligned with axis 105. Each of the load cells 180 are disposed radially opposite one another about axis 105 (i.e., angularly spaced 180° apart about axis 105) so that load cells 180 are axially aligned but spaced relative to axis 171. Similarly, each of the buttons 172 are disposed radially opposite one another about axis 105 (i.e., angularly spaced 180° apart about axis 105) so that buttons 172 are axially aligned but spaced apart relative to axis 171. In addition, in this embodiment, each button 172 includes a radially extending portion 177 (with respect to axis 105) that engages with a similar radially extending portion 177 extending from the other button 172 within the load measurement assembly 170', 170" (e.g., portions 177 engage at a point or location proximate reaction rod 190). Without being limited to this or any other theory, when buttons 172 of each load measurement assembly 170', 170" are spaced approximately 180° apart from one another about axis 105 and engage with one another (e.g., via radially extending portions 177), the relative pressure difference between the wellbore 11 environment (e.g., within throughbore 36 in FIG. 1) and the internal cavities of sub 150 (e.g., cavity 192 discussed below) is balanced across buttons 172 so that neither button 172 is biased radially inward toward axis 105 due to the pressure within the wellbore 11.

Each button 172 includes a radially inner open end 172a proximal axis 105 and a radially outer closed end 172b opposite open end 172a (distal axis 105). A cavity or recess 176 extends axially into button 172 from open end 172a to a planar surface 175 oriented parallel to axis 105. In this embodiment, the radially extending portion 177 extends axially from open end 172a along axis 171 (or radially from open end 172 relative to axis 105). Closed end 172b includes a hemispherical or spherical bearing surface 174. Buttons 172 are arranged along axis 171 and slidingly disposed within ports 157. A plurality of annular sealing assemblies 179 are disposed about buttons 172. Each seal assembly 179 includes an annular groove or channel 179' disposed about the outer surface of the corresponding button 172 and an annular sealing member 179" (e.g., O-ring, wiper seal, etc.) seated in the channel 179'. Thus, seal assemblies 179 form annular static seals with buttons 172 and annular dynamic seals with body 156 to prevent or at least restrict the flow of fluid between buttons 172 and body 156 during operations.

Referring still to FIG. 6, each load cell 180 is at least partially disposed within a recess 176 of a corresponding button 172. In general, each load cell 180 can be any device, transducer, or sensor known in the art for measuring or detecting an amount of applied force or load (e.g., such as along a particular axis). For example, in some embodiments, each load cell 180 is a model S401-200N sensor manufactured by Strain Measurement Devices located in Wallingford, Conn.

A biasing member 178 is disposed within each recess 176 and positioned between load cell 180 and planar surface 175. In this embodiment, each biasing member 178 comprises a plurality of Belleville washers; however, it should be appreciated that any suitable biasing member(s) may be disposed between planar surface 175 and load cell 180 within recess 176 in other embodiments. For example, in other embodiments, biasing members 176 may comprise one or more coiled springs that bear against planar surface 175 and load cell 180. Also, it should be appreciated that while a plurality of biasing members 176 are utilized in the embodiment of FIG. 6, only a single biasing member 176 may be disposed between surface 175 and load cell 180 in other embodiments.

During operations, each biasing member 176 biases the corresponding button 172 and load cell 180 axially apart (relative to axis 171), thereby urging load cell 180 into engagement with a mounting ring 184 secured to reaction rod 190 via a pin 186, and urging hemispherical surface 174 into engagement with a pair of retainer pins 188 extending through body 156 perpendicular to both axes 105, 171. In other embodiments, pins 188 may be replaced with an annular shoulder extending within port 157.

Referring still to FIG. 6, it should be appreciated that pins 188 are positioned within port 157 so a portion of hemispherical surface 174 projects radially (relative to axis 105) beyond the radially outer surface 158 (or axially beyond surface 158 with respect to axis 171). In some embodiments, hemispherical surface 174 projects between 0.000 and 0.050 inches, inclusive, and may project approximately 0.022 inches. In this embodiment, retainer pins 188 comprise spring pins; however, any suitable pin may be used in other embodiments. While not specifically shown, it should be appreciated that the load cells 180 of second load measurement assembly 170" bear against another mounting ring (e.g., mounting ring 184) that is also secured to reaction rod 190.

A conductor 182 (e.g., a cable, wire or other electrical coupling conduit) extends from load cell 180 and is routed through cavity 192 within load measurement sub 150 axially toward data acquisition and power sub 120. In at least some embodiments, load cells 180 are electrically coupled to one or more components within sub 120 via conductors 182 (e.g., memory 124, controller 126, power source 122, etc.). Conductors 182 are shown to terminate within cavity 192 of load measurement sub 150 in FIG. 6; however, this is merely done so as not to unduly complicate the figure, and it should be appreciated that in this embodiment conductors 182 extend out of cavity 192 of load measurement sub 150 and route internally within data and power sub 120 as previously described.

Referring now to FIGS. 1, 2, and 6, during operations, force measurement assembly 100 is incorporated into sucker rod 50 and surface pumping unit 20 is operated to reciprocate sucker rod 50 within throughbore 36 of tubing 32 in the manner described above. During reciprocation of sucker rod 50 (and thus also reciprocation of force measurement assembly 100), one or more buttons 172 on load measurement assemblies 170', 170" contact inner surface 34. As a result, the engaged buttons 172 are forced radially inward within ports 157 toward axis 105 so that biasing members 178 are compressed and a load is transferred to load cells 180, which measure the applied load and communicate the resulting data (e.g., data including the applied load or data indicative of the applied load) to components within the data and power sub 120 (e.g., memory 124, controller 126, power source 122, etc. shown in FIG. 3) via conductors 182. In at least some embodiments, the number and placement of force measurement assemblies 100 within sucker rod 50 is initially set or determined by mathematical modeling and estimation of the anticipated contact points between sucker rod 50 and tubing 32. Thus, the use of force measurement assemblies 100 can be used to experimentally confirm the accuracy of this initial mathematical estimation. The force or load measurements obtained by load measurement assemblies 170', 170" (e.g., via load cells 180) are then be stored on memory 124 (see FIG. 3) in sub 120, so that they may be retrieved later when sucker rod 50 is pulled to the surface 5. In other embodiments, the measured load values from assemblies 170', 170" are transmitted via a wired or wireless telemetry network to equipment disposed at the surface 5.

Referring briefly to FIG. 3, during reciprocation of sucker rod 50, the tension on or in sucker rod 50 is also measured by tension measurement device 112. The recorded tension values are communicated to data and power sub 120 and stored within memory 124 for later retrieval along with the load measurement values captured by load measurement assemblies 170 (e.g., load measurement assemblies 170', 170"). However, as described above for load values from assemblies 170', 170", in some embodiments, the measured tension values may be transmitted by wire or wirelessly to equipment disposed at the surface. Without being limited to this or any other theory, simultaneous measurement of tension within sucker rod 50 and of the load transferred between load measurement assemblies 170', 170" (e.g., load measurement assemblies 170', 170") and inner surface 34 of tubing 32 provides an indication of how the tension in the sucker rod 50 affects the side load measurement with assemblies 170', 170", and allows a determination of the location of the highest load during a pumping stroke with sucker rod 50.

Figure 7:
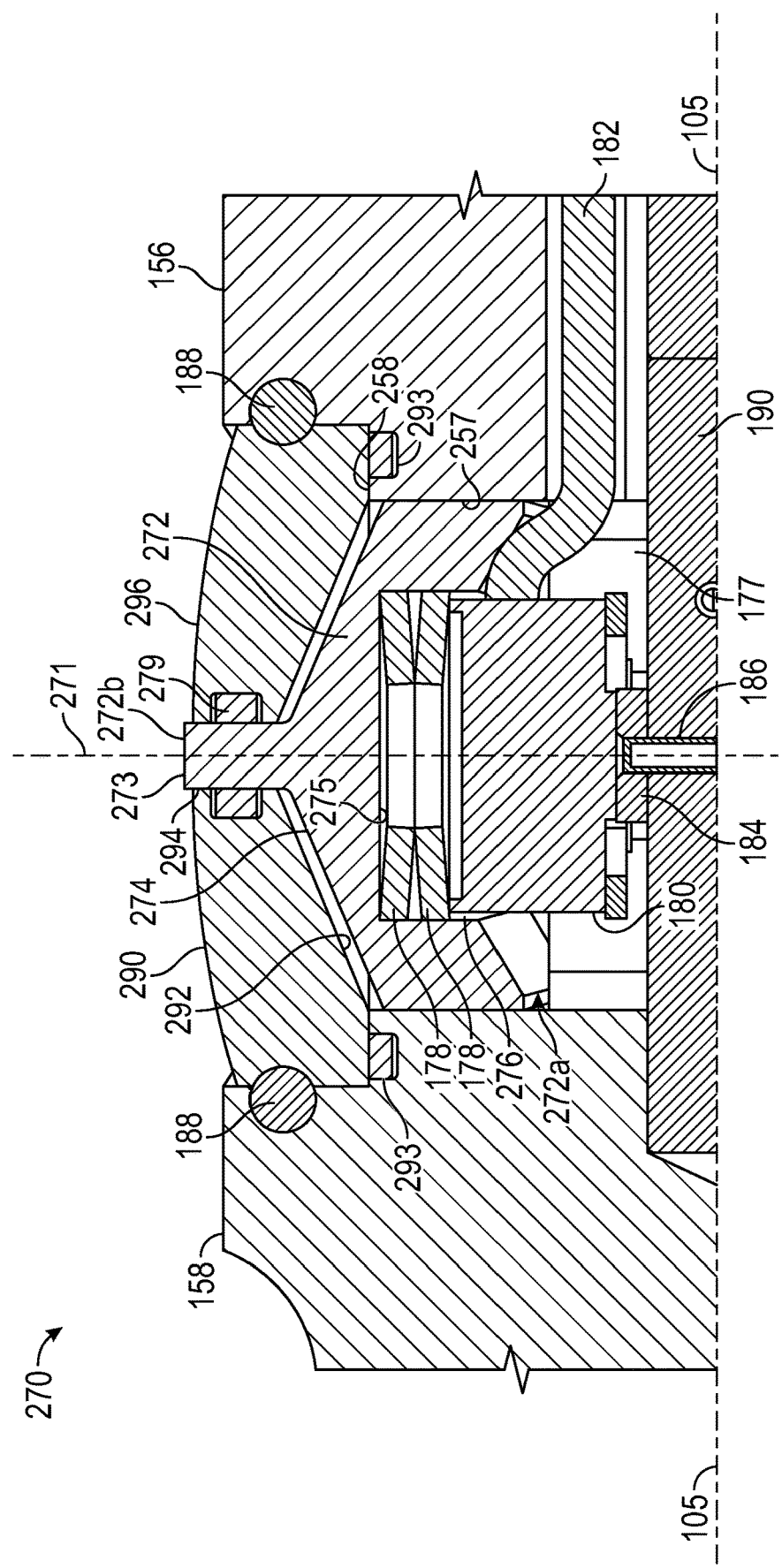
FIG. 7 is an enlarged cross-sectional side view of an embodiment of a load measurement assembly for use in the load measurement sub of FIG. 4.

Referring now to FIG. 7, an alternative embodiment of a load measurement assembly 270 that can be used in place of one or more of the load measurement assemblies 170 (170', 170") previously described is shown. Load measurement assembly 270 is similar to load measurement assembly 170 previously described. Therefore, like components between assemblies 270, 170 are labeled with like numerals, and the discussion below will focus on the features of load measurement assembly 270 that are different from load measurement assemblies 170', 170".

Load measurement assembly 270 is disposed within a port 257 rather than port 157 in body 158 of load measurement sub 150. Port 257 includes an annular planar shoulder 258 that extends axially with respect to axis 105. A cover or retainer 290 is disposed within port 257 and engages or abuts with shoulder 258. Retainer 290 includes a frustoconical surface 292 on a first or inner side, a hemispherical surface 296 on a second or outer side, and a port or throughbore 294 extending between surfaces 292, 296. Retainer 290 is disposed within port 257 so that throughbore 294 is aligned with a central axis 271 that is orthogonal to central axis 105. In this embodiment, retainer 290 is secured within port 257 via a pair of retainer pins 188, each being the same as previously described above for load measurement assemblies 170', 170".

Load measurement assembly 270 also includes a button 272 in place of button 172 (see FIG. 6). Button 272 includes a first or open end 272a, a second or closed end 272b opposite open end 272a, and a cavity or recess 276 extending axially from open end 272a to a planar surface 275. Closed end 272b includes a cylindrical projection 273 and a frustoconical surface 272 extending from projection 273. In addition, button 272 also includes a radially extending portion 177 that functions in generally the same way as the radially extending portion 177 on button 172.

As shown in FIG. 7, load cell 180 is at least partially disposed within recess 276 and a plurality (or at least one) of biasing members 178 is disposed within recess 276 axially between planar surface 275 and load cell 180 along axis 271. During operations, biasing members 178 bias button 272 and load cell 180 apart from one another along axis 271 until load cell 180 engages or abuts mounting ring 184 secured to reaction rod 190. Button 272 is biased radially outward from axis 105 (or axially along axis 271) until frustoconical surface 274 engages or abuts frustoconical surface 292 on retainer 290. In addition, button 272 is biased along axis 271 via biasing member 178 so that projection 273 extends through throughbore 294 and projects axially therefrom. Thus, projection 273 on button 272 extends radially outward from radially outer surface 158 of load measurement sub 150 and from hemispherical surface 296 on retainer 290 with respect to axis 105.

An annular seal assembly 279 is disposed along the inner surface of retainer 290 defining throughbore 294 and around projection 273. A static seal is formed between seal assembly 279 and retainer 290 and a dynamic seal is formed between seal assembly 279 and projection 273 to restrict and/or prevent the flow of fluid between projection 273 and throughbore 294 during operations. In addition, another annular seal assembly 293 is disposed on shoulder 258 such that a static seal is formed between shoulder 258 and retainer 290 to prevent or at least restrict the flow of fluid between port 257 and retainer 290 during operations. Without being limited to this or any other theory, the use of retainer 290 separates the tensile and pressure loads experienced by sub 150 during operations from the throughbore 294 that receives projection 273 therethrough. As a result, the seal assembly 279 and throughbore 294 are subjected to at least a reduced level of deforming forces (which may deform assembly 279 and/or throughbore 294 into an ovoid shape in some circumstances), so that a seal may be maintained throughout operations. In addition, in at least some embodiments, the seal assembly 279 is configured to engage projection 273 with as little friction as possible so that seal 279 is prevented from overly hindering the movement of projection 273 within throughbore 294 (and thus reduce the resolution of any load measurements), while still maintain adequate sealing engagement with projection 273.

While not specifically shown in FIG. 7, it should be appreciated that load measurement assembly 270 includes another button 272, retainer 290, and load cell 180 arranged in the same manner, but disposed radially opposite the depicted button 272, retainer 290, and load cell 180 about axis 105.

Referring now to FIGS. 1, 2, and 7, during operations while sucker rod 50 and force measurement assembly 100 are reciprocated within tubing string 32, one or both buttons 272 of load measurement assembly 270 may engage with inner surface 34 of tubing 32 in the same manner as described above for buttons 172 in load measurement assemblies 170', 170". Specifically, projection 273 of each engaged button 272 may engage with inner surface 34 so that button 272 is forced radially inward within port 257 toward axis 105 so that biasing members 178 are compressed and a load is transferred to load cell 180. Load cell 180 then registers or measures the applied load and the resulting data (e.g., data including the applied load or data indicative of the applied load) is transmitted to components within the data and power sub 120 (e.g., memory 124, controller 126, power source 122, etc. shown in FIG. 3) via conductors 182 in the same manner described above for load measurement assemblies 170', 170". During these operations with load measurement assembly 270, other than projection 273, the other components of the engaged button 272 (e.g., frustoconical surface 274) are shielded from the environment within throughbore 36 by retainer 290. In addition, referring briefly to FIGS. 3 and 7, during operations with load measurement assembly 270, the tension in the sucker rod 50 may be measured with the tension measurement device 112 within tension measurement sub 110 in the same manner as discussed above.

Figure 8:
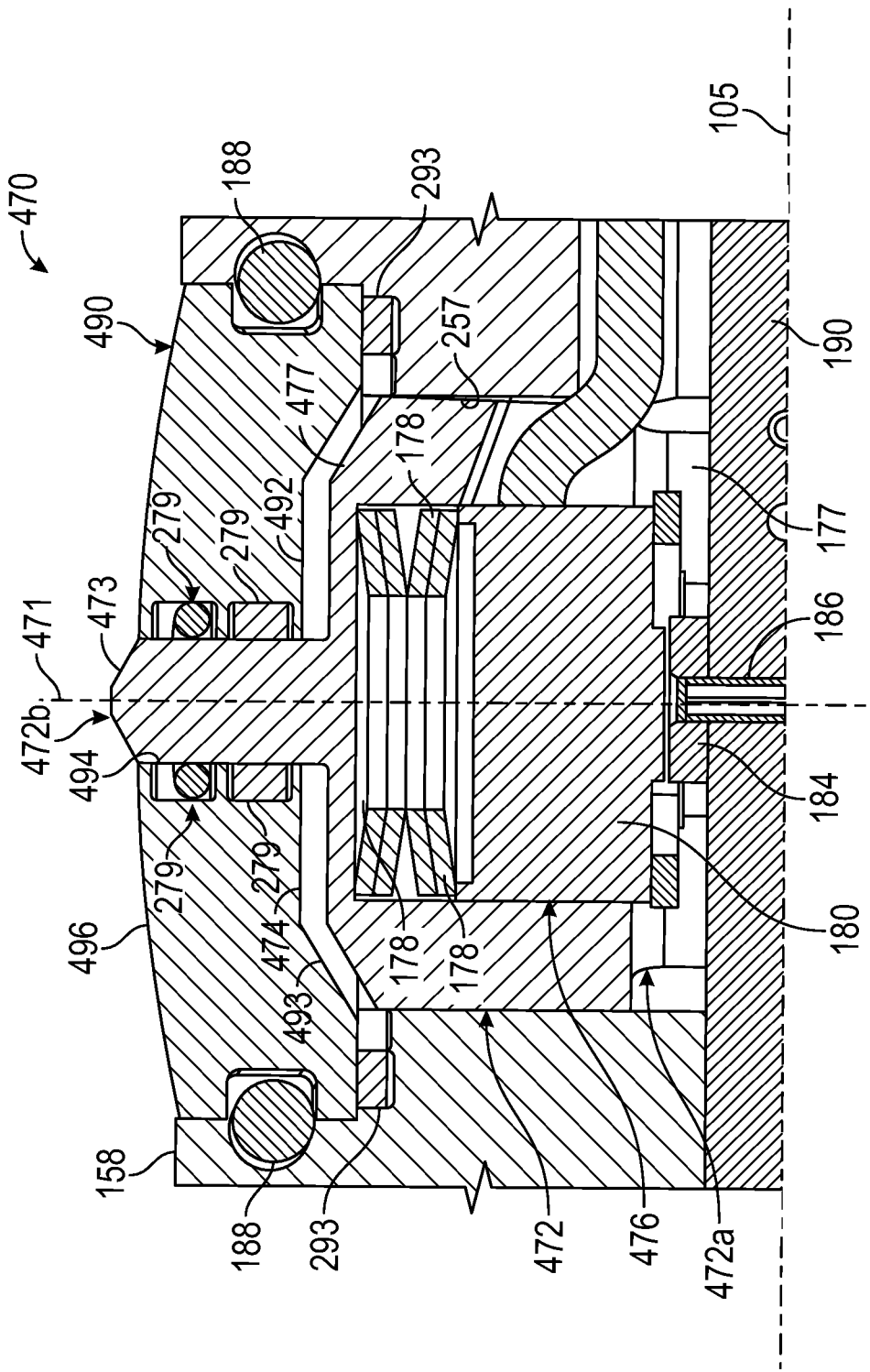
FIG. 8 is an enlarged cross-sectional side view of an embodiment of a load measurement assembly for use in the load measurement sub of FIG. 4.

Referring now to FIG. 8, another alternative embodiment of a load measurement assembly 470 that can be used in place of one or more of the load measurement assemblies 170 (170', 170") previously described is shown. Load measurement assembly 470 is similar to load measurement assembly 270 previously described. Therefore, like components between assemblies 470, 270 are labeled with like numerals, and the discussion below will focus on the features of load measurement assembly 470 that are different from load measurement assembly 270.

Load measurement assembly 470 is disposed within port 257 in body 158 of load measurement sub 150, the port 257 being the same as previously described above. A cover or retainer 490 is disposed within port 257 and engages or abuts with shoulder 258. Retainer 490 includes a frustoconical surface 493 and planar surface 492 on a first or inner side, a hemispherical surface 496 on a second or outer side, and a port or throughbore 494 extending between surfaces planar surface 492 and surface 496. Retainer 490 is disposed within port 257 so that throughbore 494 is aligned with a central axis 471 that is orthogonal to central axis 105. In this embodiment, retainer 490 is secured within port 257 via a pair of retainer pins 188, each being the same as previously described above for load measurement assemblies 170', 170".

Load measurement assembly 470 also includes a button 472 in place of button 172 (see FIG. 6). Button 472 includes a first or open end 472a, a second or closed end 472b opposite open end 472a, and a cavity or recess 476 extending axially from open end 472a to a planar surface 475. Closed end 472b includes a cylindrical projection 473, a planar surface 474 extending from projection 473, and a frustoconical surface 477 extending from planar surface 474. In addition, button 472 also includes a radially extending portion 177 that functions in generally the same way as the radially extending portion 177 on button 172.

As shown in FIG. 7, load cell 180 is at least partially disposed within recess 476 and a plurality (or at least one) of biasing members 178 is disposed within recess 476 axially between planar surface 475 and load cell 180 along axis 471. During operations, biasing members 178 bias button 472 and load cell 180 apart from one another along axis 471 until load cell 180 engages or abuts mounting ring 184 secured to reaction rod 190. Button 472 is biased radially outward from axis 105 (or axially along axis 471) until frustoconical surface 477 engages or abuts frustoconical surface 493 on retainer 490, and planar surface 474 engages or abuts planar surface 492 on retainer 490. In addition, button 472 is biased along axis 471 via biasing member 178 so that projection 473 extends through throughbore 494 and projects axially therefrom. Thus, projection 473 on button 472 extends radially outward from radially outer surface 158 of load measurement sub 150 and from hemispherical surface 496 on retainer 490 with respect to axis 105.

A pair of annular seal assemblies 279 are disposed between retainer 490 and projection 473. A dynamic seal is formed between seal assembly 479 and projection 473 and a static seal is formed between seal assembly 479 and retainer 490 to restrict and/or prevent the flow of fluid between projection 473 and throughbore 494 during operations. Seal assemblies 279 are the same as seal assemblies 279 on load measurement assembly 270, and thus function in the same way as described above.

While not specifically shown in FIG. 8, it should be appreciated that load measurement assembly 470 includes another button 472, retainer 490, and load cell 180 arranged in the same manner, but disposed radially opposite the depicted button 472, retainer 490, and load cell 180 about axis 105.

Referring now to FIGS. 1, 2, and 8, during operations while sucker rod 50 and force measurement assembly 100 are reciprocated within tubing string 32, one or both buttons 472 of load measurement assembly 470 may engage with inner surface 34 of tubing 32 in the same manner as described above for buttons 172 in load measurement assemblies 170', 170". Specifically, projection 473 of each engaged button 472 may engage with inner surface 34 so that button 472 is forced radially inward within port 257 toward axis 105 so that biasing members 178 are compressed and a load is transferred to load cell 180. Load cell 180 then registers or measures the applied load and the resulting data (e.g., data including the applied load or data indicative of the applied load) is transmitted to components within the data and power sub 120 (e.g., memory 124, controller 126, power source 122, etc. shown in FIG. 3) via conductors 182 in the same manner described above for load measurement assemblies 170', 170". During these operations with load measurement assembly 470, other than projection 473, the other components of the engaged button 472 are shielded from the environment within throughbore 36 by retainer 490. In addition, referring briefly to FIGS. 3 and 8, during operations with load measurement assembly 470, the tension in the sucker rod 50 may be measured with the tension measurement device 112 within tension measurement sub 110 in the same manner as discussed above.

Figure 9:
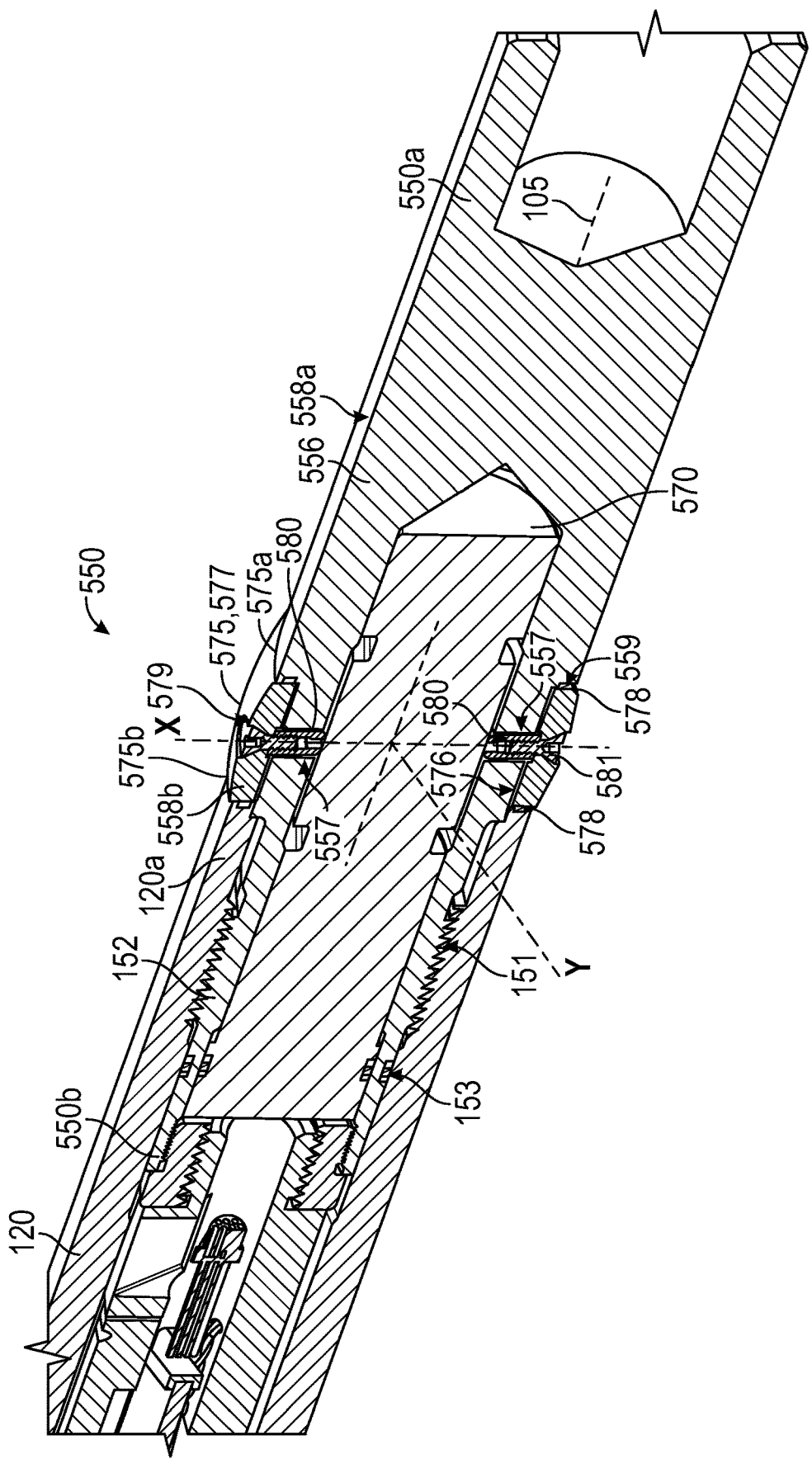
FIG. 9 is an enlarged perspective cross-sectional view of an embodiment of a load measurement sub for use with the force measurement assembly of FIG. 2.

Referring now to FIG. 9, an alternative embodiment of a load measurement sub 550 that can be used in place of load measurement sub 150 in force measurement assembly 100 previously described is shown. Load measurement sub 550 includes a first or upper end 550a and a second or lower end 550b opposite end 550a. In addition, load measurement sub 550 includes a connector 152 at second end 550b and an elongate generally cylindrical body 556 extending axially from connector 152 to first end 550a. Connector 152 includes external threads 151 for engagement with corresponding internal threads at first end 120a of data and power sub 120 (see FIG. 2). In addition, connector 152 includes one or more sealing assemblies 153 for providing an annular seal between subs 120, 550.

Cylindrical body 556 includes a generally cylindrical radially outer surface 558a extending axially from first end 550a, a generally cylindrical outer surface 558b extending axially from connector 152, and an annular planar shoulder 559 extending radially between surfaces 558a, 558b. Surface 558b is disposed at a radius that is less than surface 558a, and thus, shoulder 559 extends radially outward from surface 558b to surface 558a. A plurality of through bores or ports 557 extend radially inward from radially outer surface 558b. Ports 557 are oriented perpendicular to the central axis 105 when load measurement sub 550 is used in place of sub 150 previously described.

Referring still to FIG. 9, load measurement sub 550 includes a load pin 570 coaxially disposed within body 556, an annular load hub 575 disposed about body 556, and a plurality of circumferentially-spaced load transfer members 580 extending radially from load hub 575 to load pin 570. Load pin 570 includes a plurality of strain gauges (not shown) that measure the strain within load pin 570 in response to deformation of load pin 570. More specifically, the strain gauges measure the strain in load pin 570 along a pair of axes, labeled "X" and "Y" in FIG. 9, oriented orthogonal to axis 105 (e.g., axes X, Y intersect axis 105 and are oriented perpendicular to axis 105 and each other). In general, the strain gauges of load pin 570 can be any suitable strain gauges known in the art.

Load hub 575 is coaxially disposed about surface 558b and axially positioned between end 120a and shoulder 559. In particular, load hub 575 has a first or upper end 575a, a second or lower end 575b, a radially inner surface 576, and a radially outer surface 577. End 575a slidingly engages shoulder 559 and end 575b slidingly engages end 120a. An annular seal assembly 578 is axially positioned between each end 575a, 575b and adjacent shoulder 559 and end 120a, respectively. Seal assemblies 578 restrict and/or prevent fluid communication between ends 575a, 575b and the corresponding shoulder 559 and end 120a, respectively. Thus, seal assemblies 578 generally prevent fluid communication between the environment outside sub 550 and the inside of sub 550.

Inner surface 576 of load hub 575 is a cylindrical surface disposed at a radius that is slightly greater than the radius of cylindrical surface 558b. Consequently, hub 575 can move radially to a limited degree relative to body 556. Outer surface 577 is an outwardly bowed, convex surface. In particular, the radius of outer surface 577 increases moving axially from both ends to the axial middle of hub 575. At ends 575a, 575b, the radius of outer surface 577 is substantially the same as the outer radius of the adjacent surface 558a and the outer radius of the outer surface of sub 120, however, since the outer radius of surface 577 increases moving axially from ends 575a, 575b to the axial middle of hub 575, the axial middle portion of outer surface 577 extends radially beyond outer surface 558a and the outer surface of sub 120.

Load hub 575 also includes a plurality of circumferentially-spaced through holes 579. Each hole 579 extends radially from outer surface 577 to inner surface 576. In this embodiment, four holes 579 are provided, with each pair of circumferentially-adjacent pair of holes 579 angularly spaced 90° apart.

Referring still to FIG. 9, each load transfer member 580 is slidingly disposed in one of the ports 557 and extends radially from load hub 575 to load pin 570. In this embodiment, four uniformly circumferentially-spaced ports 557 are provided, and thus, four load transfer members 580 are provided, each pair of circumferentially-adjacent load transfer members 580 being 90° apart. In this embodiment, each load transfer member 580 is a cylindrical pin or stud having a radially outer end engaging load hub 575, a radially inner end engaging load pin 570, and an internally threaded bore extending from the radially outer end. Each load transfer member 580 and corresponding internally threaded bore is radially aligned with one hole 579 in load hub 575. A screw 581 extends through each hole 579 in load hub 575 and is threaded into the bore of one load transfer member 580, thereby fixably securing load transfer members 580 to load hub 575. Screws 581 form annular metal-to-metal seals with load hub 575, thereby preventing fluid communication through holes 579 and the bores of load transfer members 580.

As previously described, one load transfer member 580 extends through each port 557. The outer diameter of each load transfer member 580 is slightly less than the diameter of each port 557, and thus, each load transfer member 580 can move radially through the corresponding port 557 and body 556, as well as move to a limited degree circumferentially relative to the corresponding port 557 and body 556.

Referring now to FIGS. 1 and 9, during operations while sucker rod 50 and force measurement assembly 100 are reciprocated within tubing string 32, load hub 575 of load measurement sub 550 may engage with inner surface 34 of tubing 32. Specifically, outer surface 577 of load hub 575 may engage with inner surface 34 so that load hub 575 is forced radially inward toward axis 105 such that one or more load transfer members 580 are urged radially inward and a load is transferred to load pin 570. As previously described, load pin 570 includes a plurality of strain gauges that measure the strain in load pin 570 along the X and Y axes, and the resulting data (e.g., data including the strain along the X axis and the Y axis) is transmitted to components within the data and power sub 120 (e.g., memory 124, controller 126, power source 122, etc. shown in FIG. 3) via conductors 182 in the same manner described above for load measurement assemblies 170', 170". The measured strain in the X direction (along the X axis) and in the Y direction (along the Y axis) are used to calculate the magnitude of the side load force and the angle of the side load force. Such calculations can be performed using techniques known in the art. In addition, referring briefly to FIG. 3, during operations with load measurement sub 550, the tension in the sucker rod 50 may be measured with the tension measurement device 112 within tension measurement sub 110 in the same manner as discussed above.

Figure 10:
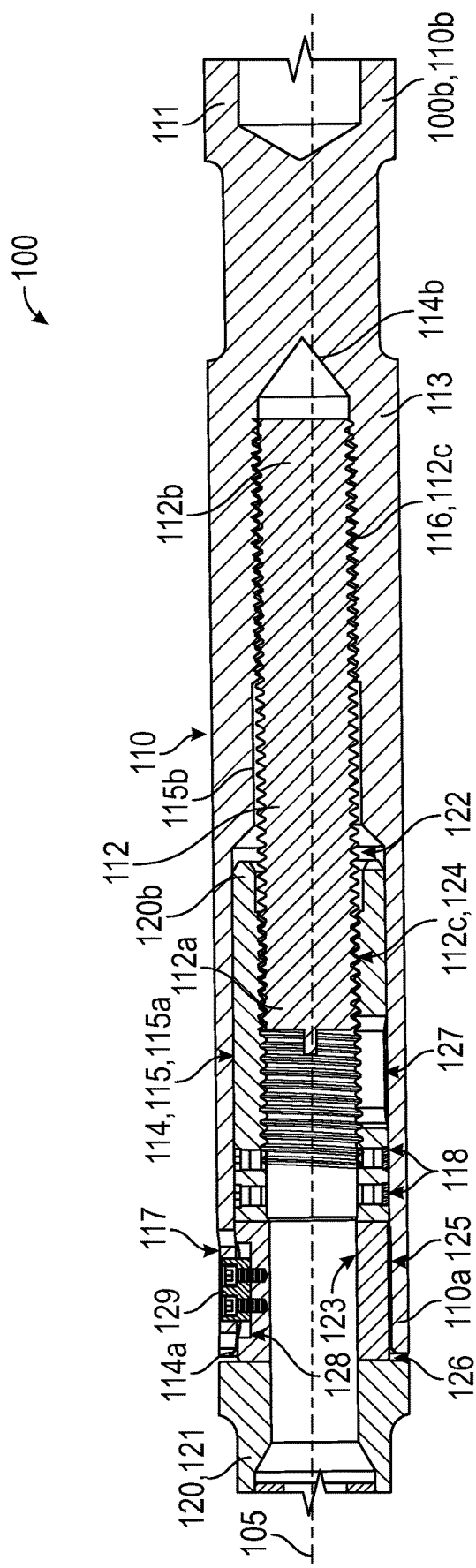
FIG. 10 is an enlarged cross-sectional side view of the tension measurement sub and the data and power sub of the force measurement assembly of FIG. 2.

Referring now to FIG. 10, tension measurement sub 110 is shown. Tension measurement device 112 is disposed within sub 110. As previously described, upper end 110a of sub 110 is attached to lower end 120b of sub 120 and lower end 110b of sub 110 defines lower end 100b of load measurement assembly 100. In addition, tension measurement sub 110 includes a connector 111 at end 110b, an elongate generally cylindrical body 113 extending axially from connector 111 to end 110a, and a receptacle 114 extending axially from end 110a. Connector 111 includes internal threads for engagement with corresponding external threads of sucker rod string 50 (FIG. 1). Receptacle 114 has a first or open end 114a at end 110a and a second or closed end 114b distal end 110a. Closed end 114b is axially spaced from connector 111. Thus, receptacle 114 does not extend to connector 111.

Receptacle 114 is defined by a radially inner surface 115 of body 113. Inner surface 115 includes a first cylindrical surface 115a extending axially from ends 110a, 114a and a second cylindrical surface 115b extending from end 114b. Cylindrical surface 115a is disposed at a radius that is greater than the radius of surface 115b, and thus, a shoulder extends radially inward from surface 115a to surface 115b. Internal threads 116 are provided along surface 115b. In addition, an elongate through slot 117 extends radially from the outer surface of body 113 to surface 115a. Slot 117 is axially positioned proximal upper end 110a and is oriented parallel to axis 105.

Referring still to FIG. 10, data and power sub 120 includes an elongate generally cylindrical body 121 extending axially between ends 120a, 120b and a receptacle 122 extending axially from end 120b. Receptacle 122 is defined by a radially inner surface 123 of body 121. Inner surface 123 is a generally cylindrical surface extending axially from end 120b. Internal threads 124 are provided along inner surface 123 proximal end 120b.

Body 121 has a radially outer surface including a cylindrical surface 125 extending axially from end 120b to an annular shoulder 126. An elongate through slot 127 extends radially from surface 125 to inner surface 123 and threads 124. Slot 127 provides access to wires (not shown) extending from tension measurement device 112 into sub 120. A recess 128 is provided along outer surface 125 proximal shoulder 126. A lock block 129 is seated within recess 128 and fixably secured to body 121. In this embodiment, lock block 129 is bolted to body 121.

Subs 110, 120 are telescopically arranged with end 120b of body 121 slidably disposed within receptacle 114 of body 113. In particular, cylindrical surfaces 115a, 125 slidingly engage with lock block 129 extending radially from recess 128 and surface 125 into slot 117. The lateral sides of lock block 129 slidingly engage the lateral sides of slot 117, thereby preventing subs 110, 120 from rotating relative to each other but allowing subs 110, 120 to move axially relative to each other. The relative axial movement of subs 110, 120 relative to each other is limited by engagement of lock block 129 with the axial ends of slot 117 and the engagement of end 110a with shoulder 126. Two annular seal assemblies 118 are radially positioned between surfaces 115a, 125. Seal assemblies 118 are axially positioned between shoulder 126 and slot 127, and restrict and/or prevent fluid communication between receptacles 114, 122 and the environment outside force measurement assembly 100.

Referring still to FIG. 10, in this embodiment, tension measurement device 112 is a generally cylindrical member having a first or upper end 112a, a second or lower end 112b, and a radially outer surface provided with external threads 112c extending between ends 112a, 112b. Thus, tension measurement device 112 may also be referred to as a tension stud. A strain gauge (not shown) measures the strain (tensile and compressional) within tension stud 112. In particular, the strain gauge is disposed within stud 112 between ends 112a, 112b, and thus, measures strain applied to stud 112 between ends 112a, 112b. In general, the strain gauge of tension measurement device 112 can be any suitable strain gauge known in the art. Lower end 112b of stud 112 is threadably coupled to body 113 via engagement of mating threads 112c, 116 and upper end 112a of stud 112 is threadably coupled to body 121 via engagement of mating threads 112c, 124. Thus, end 112a is secured to body 121 of sub 120 and moves axially therewith, and end 112b is secured to body 113 of sub 110 and moves axially therewith. As previously described, bodies 113, 121 can move axially relative to each other—when force measurement assembly 100 is subjected to tensile loads, bodies 113, 121 are axially urged away from each other (e.g., end 110a and shoulder 126 are axially urged away from each other), and when force measurement assembly 100 is subjected to compressional loads, bodies 113, 121 are axially urged toward each other (e.g., end 110a and shoulder 126 are axially urged toward each other). Tension stud 112 resists and/or prevents the relative axial movement between subs 110, 120, and is subjected to the tensile and compressional axial loads. The strain gauge within tension stud 112 measures the resulting axial strain (tensile and compressional) within tension stud 112, and the resulting data (e.g., data including the axial strain) is transmitted to components within the data and power sub 120 (e.g., memory 124, controller 126, power source 122, etc. shown in FIG. 3) via conductors (not shown). The measured axial strain is used to calculate the magnitude of the tensile and compressional axial loads applied to tension stud 112 and assembly 100. In general, the calculation of the tensile and compressional axial loads using the measured axial strain can be performed using techniques known in the art.

Referring now to FIGS. 1 and 10, during operations while sucker rod 50 and force measurement assembly 100 are reciprocated within tubing string 32, rod 50 and force measurement assembly 100 may experience axial tensile and compressional loads. As previously described, tension stud 112 measures the strain in stud 112 along axis 105, transmits the resulting data to components within the data and power sub 120, and the measured strain is used to calculate the magnitude of the tensile and compressional axial loads applied to tension stud 112 and assembly 100.

Referring again to FIG. 1, regardless of whether load measurement assemblies 170, load measurement assemblies 270, load measurement assemblies 470, or combinations thereof are utilized within load measurement sub 150 of force measurement assembly 100, after a predetermined period of time, the sucker rod 50 is pulled to the surface 5, and the data (e.g., tension data, load measurement data, etc.) is retrieved from memory 124. Thereafter, the number and placement of guides 33 is determined and/or adjusted based on the data so that the use of guides 33 within wellbore 11 may be optimized. In other words, through use of the data obtained by the load measurement assemblies (e.g., assemblies 170', 170", 270, etc.) and tension measurement device 112 (see FIG. 3), the appropriate number and arrangement of guides 33 may be utilized within wellbore 11 to avoid or at least minimize contact between sucker rod 50 and the inner surface 34 of tubing 32, and to avoid overutilization of guides 33, which increases the operating expense of the well. As previously described, in some embodiments, the load and tension values obtained from assemblies 170', 170", 270, 112, may be transferred by wire or wirelessly to equipment disposed at the surface 5.

Figure 11:
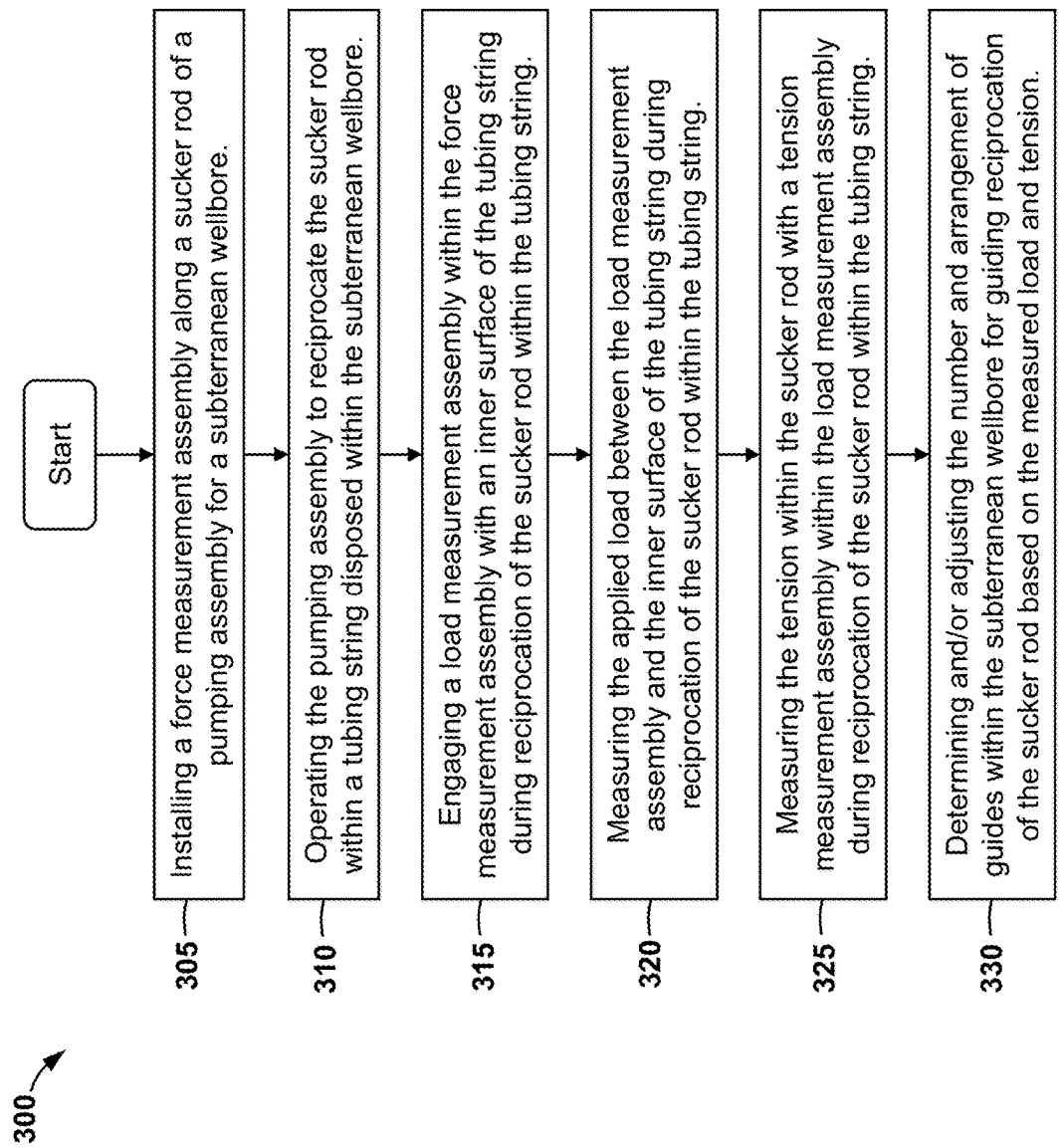
FIG. 11 is a schematic diagram illustrating an embodiment of a method in accordance with the principles disclosed herein for measuring a load and/or a tension on a sucker rod during operation of a pumping assembly for a subterranean wellbore.

Referring now to FIG. 11, a method for determining of adjusting a number and/or an arrangement of guides (e.g., guides 33) for centralizing a sucker rod of a pumping assembly within a tubing string of a subterranean wellbore is shown. While describing method 300, reference may be made to the components and assemblies of production system 10; however, it should be appreciated that method 300 may be carried out with components and assemblies that are different from those found in production system 10. Thus, any reference to the components of production system 10 is made for convenience and to enhance the description of method 300 and is not meant to limit the scope of method 300 to those specifically referenced components.

Initially, method 300 includes installing a force measurement assembly (e.g., force measurement assembly 100) along a sucker rod (e.g., sucker rod 50) of a pumping assembly (e.g., pumping assembly 10) for a subterranean wellbore (e.g., wellbore 11) at 305. Next, method 300 includes operating the pumping assembly to reciprocate the sucker rod, including the force measurement assembly, within a tubing string (e.g., tubing string 32) disposed or installed within the subterranean wellbore at 310. The tubing string may be a casing pipe or other tubing string that is configured to receive fluid produced from the formation surrounding the subterranean wellbore (e.g., oil, gas, condensate, other hydrocarbon fluids, water, etc.). During the reciprocation at 310, method 300 also includes engaging a load measurement assembly (e.g., a button 172 or 272 within load measurement assemblies 170', 170" or 270, respectively) installed within the force measurement assembly with an inner wall of the tubing string at 315. In addition, method 300 includes measuring a load transferred between the load measurement assemblies and the inner surface of tubing string at 320 (e.g., the load measurement assemblies engaging with the inner surface of tubing string at 315), and measuring a tension within the sucker rod with a tension measurement device within the force measurement assembly at 325 during reciprocation of the sucker rod within the tubing string. Finally, method 300 includes determining and/or adjusting the number and arrangement of guides within the subterranean wellbore based on the measured load and tension at 320 and 325, respectively, at 330. The guides at 330 are configured to direct or guide reciprocation of sucker rod within the tubing string, and may, in some embodiments, prevent or at least reduce contact between the sucker rod and the inner surface of the tubing string during operation of pumping assembly. In other words, guides 33 are configured to space sucker rod 50 from the inner surface 34 of tubing string 32 during reciprocation of sucker 50 during wellbore pumping operations.

Accordingly, through use of force measurement assemblies (e.g., force measurement assembly 100) within a sucker rod (e.g., sucker rod 50) of a production or pumping assembly (e.g., assembly 10), the number and arrangement of guides for directing reciprocation of the sucker rod within the subterranean wellbore (e.g., wellbore 11) may be optimized so that wear and/or failure of the sucker rod and/or tubing string within the wellbore is avoided and the expense associated with the purchase, manufacturing, and/or installation of the guides is minimized. Therefore, by use of the fore measurement assemblies according to the embodiments disclosed herein, the costs for continued production from a subterranean wellbore may be reduced.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A load measurement sub for measuring a load transferred between the load measurement sub and an inner surface of a tubing string, the load measurement sub comprising:
   a housing including a central axis, an internal cavity, and a radially outermost surface;
   a first load measurement assembly at least partially disposed within a first port extending from the radially outermost surface to the internal cavity;
   wherein the first load measurement assembly includes:
      a first button extending radially from the first port and the radially outermost surface of the housing;
      a first load cell; and
      a first biasing member disposed between the first button and the first load cell, wherein the first biasing member is configured to bias the first button away from the first load cell.

2. The load measurement sub of claim 1, wherein a portion of the first button extending radially beyond the radially outermost surface of the housing comprises a spherical surface.

3. The load measurement sub of claim 1, wherein the first biasing member comprises one or more Belleville washers.

4. The load measurement sub of claim 1, wherein a portion of the first button extending radially beyond the radially outermost surface of the housing comprises a cylindrical projection.

5. The load measurement sub of claim 4, wherein the first load measurement assembly further comprises a retainer coupled to the housing within the first port;
   wherein the retainer includes a central throughbore; and
   wherein the first biasing member is configured to bias the first button toward the retainer so that the cylindrical projection extends through the throughbore in the retainer.

6. The load measurement sub of claim 5, wherein the retainer includes a spherical surface and a frustoconical surface;
   wherein the first button includes a frustoconical surface includes a frustoconical surface; and
   wherein the first biasing member is configured to bias the first button toward the retainer so that the frustoconical surface on the first button engages with the frustoconical surface on the retainer.

7. The load measurement sub of claim 1, further comprising a second load measurement assembly disposed at least partially disposed within a second port extending from the radially outermost surface to the internal cavity;
   wherein the second load measurement assembly is axially spaced from the first load measurement assembly along the central axis; and
   wherein the second load measurement assembly includes:
      a second button extending radially from the second port and the radially outermost surface of the housing;
      a second load cell; and
      a second biasing member disposed between the second button and the second load cell, wherein the second biasing member is configured to bias the second button away from the second load cell.

8. The load measurement sub of claim 7, wherein the first biasing members are configured to bias the first button away from the first load cell along a first axis that is orthogonal to the central axis;
   wherein the second biasing members are configured to bias the second button away from the second load cell along a second axis that is orthogonal to the central axis;
   wherein the first axis is shifted between 0° and 180° from the second axis about the central axis of the housing.

9. The load measurement sub of claim 8, wherein the first axis is shifted approximately 90° from the second axis about the central axis of the housing.

10. The load measurement sub of claim 8, wherein the first load measurement assembly further comprises:
   a third button extending radially from a third port extending from the radially outermost surface to the internal cavity, wherein the third button extends from the radially outermost surface of the housing;
a third load cell; and
a third biasing member disposed between the third button and the third load cell, wherein the third biasing member is configured to bias the third button away from the third load cell;
wherein the second load measurement assembly further comprises:
a fourth button extending radially from a fourth port extending from the radially outermost surface to the internal cavity, wherein the fourth button extends from the radially outermost surface of the housing;
a fourth load cell; and
a fourth biasing member disposed between the fourth button and the fourth load cell, wherein the fourth biasing member is configured to bias the fourth button away from the fourth load cell.

11. The load measurement sub of claim 10, wherein the first button is radially opposite the third button about the central axis, and wherein the second button is radially opposite the fourth button about the central axis.

12. A force measurement assembly for a sucker rod of a pumping assembly, the force measurement assembly comprising:
the load measurement sub of claim 1; and
a data and power sub coupled to the load measurement sub, wherein the data and power sub includes a memory coupled to the first load measurement assembly and configured to receive measured load values from the load measurement assembly.

13. The force measurement assembly of claim 12, wherein the data and power sub further includes a power source configured to provide electrical power to the first load measurement assembly of the load measurement sub.

14. The force measurement assembly of claim 12, further comprising:
a tension measurement sub coupled to the data and power sub;
wherein the tension measurement sub includes a tension measurement device configured to measure a tension on or within the sucker rod when the force measurement assembly is coupled to the sucker rod.

* * * * *